No. 615,025.  
D. F. HULBERT.  
RELIEF PHOTOGRAPH AND METHOD OF PRODUCING SAME.  
(Application filed Feb. 23, 1897.)  
(Specimens.)  
Patented Nov. 29, 1898.
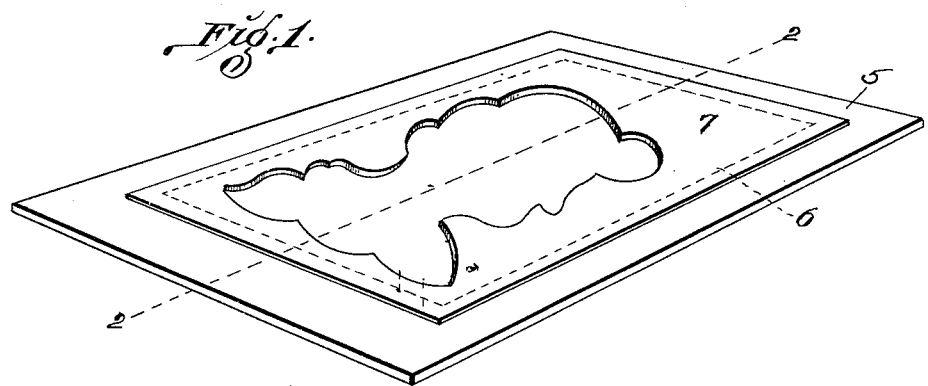
Fig. 1.
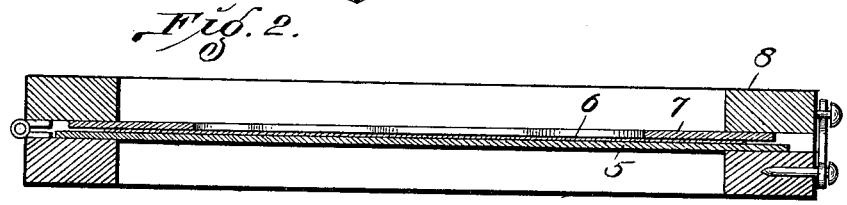
Fig. 2.
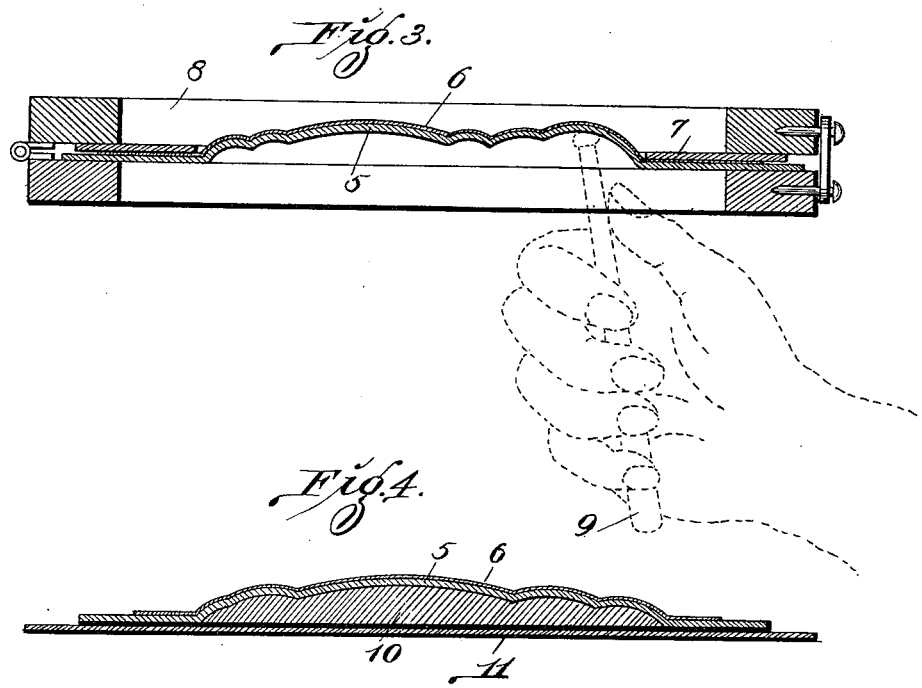
Fig. 3.
Fig. 4.
Attest:  
M. P. Smith  
S. G. Wells
Inventor:—  
Duran F. Hulbert.  
By Higdon, Longan & Higdon,  
Attys.

UNITED STATES PATENT OFFICE.

DURAN F. HULBERT, OF ST. LOUIS, MISSOURI.

RELIEF-PHOTOGRAPH AND METHOD OF PRODUCING SAME.

SPECIFICATION forming part of Letters Patent No. 615,025, dated November 29, 1898.

Application filed February 23, 1897. Serial No. 624,690. (Specimens.)

*To all whom it may concern:*

Be it known that I, DURAN F. HULBERT, of the city of St. Louis, State of Missouri, have invented certain new and useful Improvements in the Art of Producing Embossed Photographs, of which the following is a full, clear, and exact description, reference being had to the accompanying drawings, forming a part thereof.

My invention relates to the art of producing embossed photographs and pictures; and it consists in the novel methods, processes, and features herein illustrated, described, and claimed.

Figure 1 is a view in perspective of a photographic print or other picture arranged upon a malleable mount and having a mask in position. Fig. 2 is a sectional view taken approximately on the line 2 2 of Fig. 1 after the parts shown in Fig. 1 have been placed in the operating-frame. Fig. 3 is a sectional view analogous to Fig. 2, taken after the photograph or picture has been embossed and illustrating the operation of embossing. Fig. 4 is a sectional view analogous to Fig. 3, taken after the embossed photograph or picture has been removed from the frame and cement filling placed in the depression and the back pasted in position to cover the filling.

In producing embossed photographs and pictures in accordance with the principles of my invention I employ the mount 5, cut from a sheet of pliable non-elastic malleable metal, such as lead, and the photographic print or other picture 6 (shown in outline in dotted lines in Fig. 1) is attached to said mount 5, and the open mask 7 is placed against the opposite side of the front 6 from the mount. The opening in the mask 7 follows the outline of the portion of the print or picture which it is desired to put into relief. The mount 5, together with the print and the mask, is then placed in the frame 8 and clamped in such a way that the mask is held securely in the desired position relative to the print. The operator then takes the embossing-tool 9 and places it against the opposite side of the mount from the print, and by the operation of said embossing-tool presses the desired portions of said mount and said print outwardly into the opening in the mask, and thus produces the desired relief. By using a pliable non-elastic malleable metallic mount, such as a sheet of soft lead for the print, the mount and print will readily stretch under the influence of the embossing-tool to form the desired relief. After the relief has been formed the frame and mask are removed from the photograph or picture. The indentations on the back side of the mount are filled with a suitable material 10 in a plastic state, such as plumber's cement, which will readily harden, and the back or rigid mount 11 is then attached by any suitable means, such as cement.

My invention may be used in producing embossed pictures of various kinds—such, for instance, as prints produced by the well-known half-tone process and all well-known pictures and drawings produced by the engravers' and printers' arts—and my invention may furthermore be used in producing embossed mechanical drawings, as will readily appear from the above description.

I claim—

1. As an article of manufacture, an embossed picture on a pliable non-elastic malleable metallic mount, substantially as herein specified.

2. As an article of manufacture, an embossed picture on a lead mount, substantially as herein specified.

3. An embossed picture, consisting of the picture proper, a lead mount on which the picture is fixed, the picture and the lead mount being embossed, and a suitable filling placed upon the back of said lead mount, substantially as specified.

4. The improvement in the art of producing embossed photographs and pictures, which consists of attaching the photographic print or picture to a pliable, non-elastic, malleable, metallic mount, such as lead, and embossing the mount and print with a tool held in the hand, substantially as specified.

5. The improvement in the art of producing embossed photographs and pictures, which consists of attaching the photographic print or picture to a pliable, non-elastic, malleable, metallic mount, such as lead, and embossing the mount and print, or picture, and filling the depressions upon the back of said malleable, metallic mount with a plastic material which will harden when cold or dry, substantially as specified.

6. The improvement in the art of producing embossed photographs and pictures, which consists of attaching the photographic print or picture to a pliable, non-elastic, malleable, metallic mount, such as lead, and embossing the mount and print or picture, substantially as specified.

In testimony whereof I affix my signature in presence of two witnesses.

DURAN F. HULBERT.

Witnesses:
EDWARD E. LONGAN,
MAUD GRIFFIN.